United States Patent
Qi et al.

(10) Patent No.: US 8,208,585 B2
(45) Date of Patent: Jun. 26, 2012

(54) D-PSK DEMODULATION BASED ON CORRELATION ANGLE DISTRIBUTION

(75) Inventors: Yihong Qi, Sunnyvale, CA (US); Azzedine Touzni, Algonquin, IL (US)

(73) Assignee: QUALCOMM Incorporated, San Diego, CA (US)

( * ) Notice: Subject to any disclaimer, the term of this patent is extended or adjusted under 35 U.S.C. 154(b) by 782 days.

(21) Appl. No.: 12/212,299

(22) Filed: Sep. 17, 2008

(65) Prior Publication Data

US 2010/0067618 A1    Mar. 18, 2010

(51) Int. Cl.
*H04L 27/00*   (2006.01)
*H03D 3/22*    (2006.01)
*H03M 13/00*   (2006.01)

(52) U.S. Cl. ............ 375/324; 375/330; 714/755
(58) Field of Classification Search ........ 375/324, 375/330; 714/755
See application file for complete search history.

(56) References Cited

U.S. PATENT DOCUMENTS

| | | | | |
|---|---|---|---|---|
| 5,703,908 A | * | 12/1997 | Mammone et al. | 375/278 |
| 6,029,264 A | * | 2/2000 | Kobayashi et al. | 714/755 |
| 6,359,935 B1 | * | 3/2002 | Hui et al. | 375/262 |
| 6,426,978 B1 | * | 7/2002 | Bottomley et al. | 375/265 |
| 6,507,012 B1 | * | 1/2003 | Medard et al. | 250/225 |
| 6,658,071 B1 | * | 12/2003 | Cheng | 375/348 |
| 7,860,191 B2 | * | 12/2010 | Qi et al. | 375/330 |
| 2006/0093081 A1 | * | 5/2006 | Ibrahim et al. | 375/354 |

FOREIGN PATENT DOCUMENTS

WO    WO9719539 A1    5/1997

OTHER PUBLICATIONS

Hass et a. "Two-Dimensional Differential Demodualtion for OFDM" IEEE. Published on Apr. 4, 2003.*
Divsalar, D. et al., "Multiple-symbol differential detection of MPSK," IEEE Trans. Communication, vol. 38, No. 3, Mar. 1990, pp. 300-308.
Wong, P.C. et al., "Nonredundant error correction analysis and evaluation of differential detected pi/4-shift DQPSK systems in a combined CCI and AWGN environment," IEEE Trans. Vehicular Technology, vol. 41, No. 1, Feb. 1992, pp. 35-48.
Hewavithana, C. et al., "Soft decisions for DQPSK demodulation for the Viterbi decoding of the convolutional codes," Proceedings of 2003 International Conference on Acoustic, Speech and Signal Processing, pp. IV-17-IV-20.
Haas E et al: "Two-dimensional differential demodulation for OFDM" IEEE Transactions on Communications, IEEE Service Center, Piscataway, NJ, US, vol. 51, No. 4, Apr. 1, 2003, pp. 580-586, XP011096568 ISSN: 0090-6778 p. 580, right-hand column, line 2 p. 582-583, left-hand column figure 3.
International Search Report Written Opinion—PCT/US2009/057122, International Search Authority—European Patent Office—Dec. 22, 2009.

* cited by examiner

*Primary Examiner* — David C. Payne
*Assistant Examiner* — Sarah Hassan
(74) *Attorney, Agent, or Firm* — Charles Chesney

(57) ABSTRACT

An apparatus and method is described that provides optimal D-PSK demodulation based on the distribution of phase differences between successive D-PSK symbols. A plurality of D-PSK data symbols are received, and each symbol is characterized by a real component and an imaginary component. An angle of correlation between any two successive symbols is calculated. A variance of correlation angles is obtained by using data symbols or pilot symbols, if available. The probability of the correlation angle being each of possible phase difference according the D-PSK constellation is then determined. From the probabilities of the particular correlation angle, a probability of each input bit being a "0" or "1" is determined.

24 Claims, 4 Drawing Sheets

D-PSK DEMODULATION BASED ON CORRELATION ANGLE DISTRIBUTION

BACKGROUND

1. Field of the Invention

The present invention relates in general to Differential Phase Shift Keying (D-PSK) demodulation. More particularly, the invention is directed to methods and apparatus providing optimal D-PSK demodulation based on correlation angle distribution.

2. Related Art

The need for high speed robust communications systems has grown dramatically in recent years. Such a demand has been fueled by the need to support various communications market segments, e.g., ever increasing numbers of voice calls, higher information transfer rates, better connectivity to the Internet. Both consumer and business market segments have witnessed unparalleled increases in growth, and such growth is predicted to continue for the foreseeable future. In theory, communications systems could accommodate the demand for increased data throughput by using larger bandwidth for communication. However, bandwidth is a limited resource and is usually highly government regulated. Accordingly, communication systems designers have sought to achieve greater data throughput utilizing existing bandwidth communication channels, either by using more efficient modulation/demodulation schemes, or by finding ways to overcome practical limitations imposed by the communications environment, e.g. the communications channel.

The D-PSK, and particularly Differential Quadrature Phase Shift Keying (D-QPSK) modulation technique, is commonly used in modern wireless communication systems.

PSK modulation techniques encode information bits, such as, for example, "1" and "0" as a phase with respect to some reference. Each pattern of bits is represented by a symbol of a particular phase. A bit is represented by either "0" or "1".

Alternatively, instead of using the bit patterns to set the phase of the symbol, it can instead be used to control a phase difference of symbols from one to the next. In other words, a particular bit pattern specifies that the symbol has a certain phase difference with respect to the immediately proceeding symbol. The demodulator then determines the changes in phase from one symbol to the next received symbol rather than determining the absolute phase of a symbol itself. Since this scheme depends on the difference in phase between successive symbols, rather than a phase with respect to a reference symbol, it is referred to as differential PSK (D-PSK). For example, for a D-QPSK, a phase difference $\pi/4$ between two successive symbols represents the bit pattern (0,0), a phase difference $3\pi/4$ represents (1,0), $-3\pi/4$ represents (1,1) and $-\pi/4$ represents (0,1).

Because of the imperfection of communication channels and signal processing carried out by a receiver's front end, two successively received symbols rarely have a measurable angular difference that is exactly equal to one of the angular differences of a D-PSK modulation table. Communication channels are often dynamic in that they introduce amplitude and phase distortions, as well as noise contributions, into a propagating signal in an irregular and time-varying manner. When symbols are received, the angular differences between successive symbols must be interpreted by a demodulator to determine which bit patterns they represent.

In order to improve the performance of a given communications system, it is desirable to utilize a D-PSK demodulation scheme that is robust to dynamic channels, imperfect synchronization and other imperfect front end receiving processes.

The conventional approach to D-PSK demodulation is a non-coherent approach. Two successively received symbols are first correlated to determine a phase difference between them. Standard PSK demodulation is then carried out to estimate the bit pattern represented by the determined phase difference. Standard PSK is optimal when a communication channel conforms to the assumption that successively received symbols are subject to the same unknown phase.

In the real world, however, communication channels in many situations are not static, but rather, dynamic. Hence the phase rotations in received symbols, which result from dynamic channel conditions and imperfect front end receiving operations, are time-varying. Therefore, the performance of a conventional D-PSK demodulation system optimized for a static communications channel can be considerably degraded in such circumstances. For example, a conventional D-QPSK demodulation algorithm in an ISDB-T compliant system, without symbol interleaving, provides a bit error rate (BER) of 0.002 before Reed-Solomon decoding for a 2-path Rayleigh fading channel with a Doppler frequency of 70 Hz.

Based on the basic conventional approach, several variations on conventional D-PSK demodulation have been proposed and can be found in the literature, such as, for example, [Divsalar1990], [Hewavithana2003] and [Wong1992] which assumed different channel characteristics and exploited different optimization criteria. The complete citations to these references are: [Divsalar 90] D. Divsalar and M. Simon, "Multiple-symbol differential detection of MPSK," IEEE Trans. Communication, vol. 38, no. 3, March 1990, pp. 300-308; [Wong1992] P. C. Wong and P. T. Mathiopoulos, "Non-redundant error correction analysis and evaluation of differential detected pi/4-shift DQPSK systems in a combined CCI and AWGN environment," IEEE Trans. Vehicular Technology, vol. 41, no. 1 Feb. 1992, pp. 35-48; and [Hewavithana2003] T. C. Hewavithana and M. Brookes, "Soft decisions for DQPSK demodulation for the Viterbi decoding of the convolutional codes," Proceedings of 2003 International Conference on Acoustic, Speech and Signal Processing, pp. IV-17-IV-20.

As described more fully below, this invention is directed to a different type of variation than those described in the literature.

BRIEF SUMMARY OF THE INVENTION

Embodiments of the invention provide a novel approach to D-PSK demodulation based on correlation angle distribution. The correlation angle distribution is used to make a decision as to which bit pattern is represented by the phase shift from one symbol to the next. More specifically, the "soft" bit information represented by the phase shift is to be decided, i.e., the probability of a bit being "0" and/or "1". For example, in case of D-QPSK, instead of making a "hard" decision that a particular phase shift represents (0,0), (1,0), (0,1) or (1,1), probabilistic analysis is carried out in order to determine the probability of the first and the second bits being "0" and/or "1".

The inventive technique is founded on the observation that the angle difference of two successive D-PSK symbols obtained through a static or time-varying communication channel conforms to a Gaussian distribution. The inventive method of D-PSK demodulation includes the following.

First, the angle difference of any two successively received D-PSK symbols is calculated. The angle difference is evaluated as the angle of the correlation of two successively received symbols. In certain circumstances, the computation complexity can be reduced if continuous pilot symbols are used, as will be described in the following section of this patent document entitled DETAILED DESCRIPTION OF THE INVENTION. Then the angle difference of any two successively received pilot symbols also needs to be calculated. Such continuous pilot symbols are available in many practical communication systems. However, the use of pilot symbols is not necessary to practice the invention.

Secondly, an estimation is made of the variance of correlation angles based on D-PSK symbols or continuous pilot symbols.

Thirdly, given the variance of correlation angles and predetermined angle values in the D-PSK modulation table, an evaluation is made of the probability of a D-PSK correlation angle being each of the possible angle values in the D-PSK modulation table. For example if the D-PSK system is a D-QPSK system, the D-QPSK modulation table is shown as Table 1 (see DETAILED DESCRIPTION). There are four possible angle values, i.e., ($\pi/4$, $3\pi/4$, $-3\pi/4$, $-\pi/4$), in this table. Then four probabilities are determined: the probability that the correlation angle is $\pi/4$, the probability that the correlation angle is $3\pi/4$, the probability that the correlation angle is $-3\pi/4$, and the probability that the correlation angle is $-\pi/4$.

Fourthly, based only on the probabilities of a correlation angular differences being each of the possible angles of the D-PSK modulation table (four in the case of D-QPSK), the probability of each input bit being a "0" and/or "1" is determined.

Compared with a conventional D-PSK modulation method, the inventive method described herein significantly improves system performance in time-varying channels. For example, a conventional D-QPSK demodulation algorithm used in an ISDB-T compliant system, without symbol interleaving, provides a bit error rate (BER) of 0.002 before Reed-Solomon decoding for a 2-path Rayleigh fading channel with a Doppler frequency of 70 Hz. The Doppler frequency is a measure of how fast a channel is changing in the time domain. The inventive approach achieves a BER of less than 0.0001 for a higher fading frequency of 100 Hz under the same conditions.

Using the demodulation approach described herein provides several advantages including the following. The demodulation technique is robust to dynamic channels, imperfect synchronization and other imperfect front end receiving processes because the resulting effects are characterized as statistical parameters and are taken into account in real-time. The described technique has low computational complexity. Therefore its implementation and use does not require extraordinary hardware. Furthermore, the technique is theoretically optimal.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

The present invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
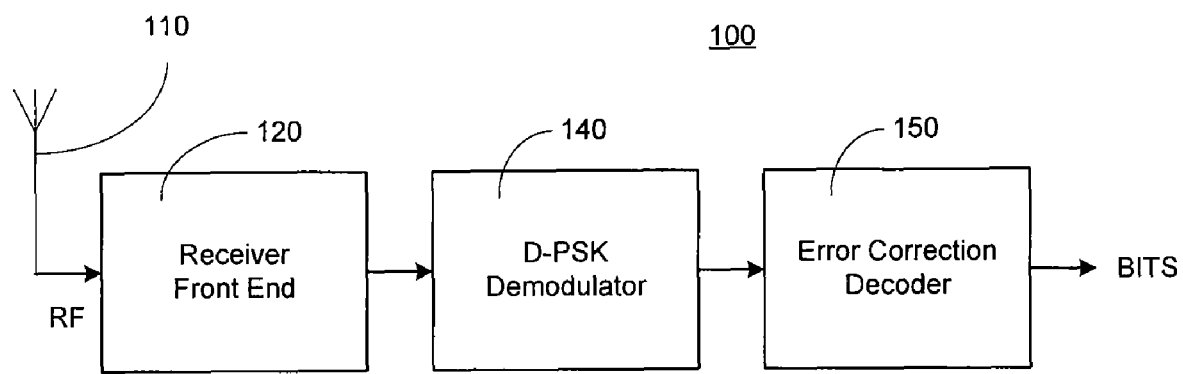
FIG. 1 is a block diagram of a D-PSK receiving communications system in which an embodiment of the present invention is employed.

FIG. 1 is an illustration of a D-PSK modulated wireless communications receiver to which embodiments of the current invention may be employed.

A typical communications receiver 100 comprises an antenna 110, a front end 120, a D-PSK demodulator 140, and an error correction decoder 150. The invention described herein applies as well to wired communications systems as it does to wireless communication systems. A wireless communications signal that has propagated through a communications channel from transmitter to receiver is captured by the antenna 110, and is turn coupled to the receiver's front-end 120. The front-end 120 provides one or more of the following functionalities: gain, down-conversion, filtering, and digitization. In addition, it may provide fast Fourier transform functionality for a multicarrier system. It is preferred that front end 120 provides synchronized baseband signals to the D-PSK demodulator 140. The demodulator 140 demodulates the signal to retrieve the underlying information bits from the signal. Finally, the demodulator 140 is coupled to the error correction decoder 150, which is in turn coupled to the output of the receiver. The error correction decoder 150 reverses the functionality of its corresponding encoder in the transmitter. Embodiments of the invention are realized within the demodulator 140.

For the sake of clarity, the embodiment described herein is directed to a particular type of D-PSK known as D-QPSK (Differential Quadratic Phase Shift Keying) which has four possible phase shift values for successive symbols. This embodiment is presented for the sake of simplicity of explanation. It is understood that the approach described in this patent document is applicable to a general D-PSK system.

D-QPSK modulation encodes two input binary bits into four possible phase differences between two successive symbols, as specified in Table 1. D-QPSK demodulation recovers those input bits by processing received symbols, ascertaining phase differences between two successive symbols and then interpreting those phase differences as two input binary bits. Received symbols, however, are usually subject to noise distortion and channel imperfection.

TABLE 1

| Input bits ($b_0, b_1$) | Output phase difference |
|---|---|
| 0, 0 | $\pi/4$ |
| 0, 1 | $-\pi/4$ |
| 1, 0 | $3\pi/4$ |
| 1, 1 | $-3\pi/4$ |

Consider two successively received D-QPSK symbols from a dynamic channel. The two symbols can be expressed as $$r_1 = A_1 \cdot e^{j\theta_1} \cdot s_1 + n_1, \quad (1)$$

and $$r_2 = A_2 \cdot e^{j\theta_2} \cdot s_2 + n_2, \quad (2)$$

where $A_1$ and $A_2$ are channel amplitudes, $\theta_1$ and $\theta_2$ are channel phases, $n_1$ and $n_2$ are independent Gaussian noise represented by complex values, and $s_1$ and $s_2$ are transmitted symbols. Channel distortion is represented by the terms $A_1$ and $e^{j\theta_1}$, and $A_2$ and $e^{j\theta_2}$. The term $s_1$ and $s_2$ are complex numbers representing transmitted data.

For a D-QPSK system, without loss of generality, $s_1$ is one of the four values ($e^{j\pi/4}$, $e^{j3\pi/4}$, $e^{-j3\pi/4}$, $e^{-j\pi/4}$, and $s_2$ is one of the four values of ($e^{j\pi/2}$, $-1$, $e^{-j\pi/2}$, 1).

The inventive demodulation approach described herein is based on the observation that the angle of the correlation of $r_1$ and $r_2$ is a Gaussian variable $N(\mu, \sigma^2)$. The angle of the correlation of $r_1$ and $r_2$ is equivalent to the phase difference of $r_1$ and $r_2$. For D-QPSK, mean $\mu$ takes a value of ($\pi/4$, $3\pi/4$, $-3\pi/4$, $-\pi/4$), equivalent to a possible phase difference between $s_1$ and $s_2$, and variance $\sigma^2$ is due to combination effects of communication channel distortions $A_1 e^{j\theta_1}$ and $A_2 e^{j\theta_2}$, and noise factors $n_1$ and $n_2$.

Figure 2:
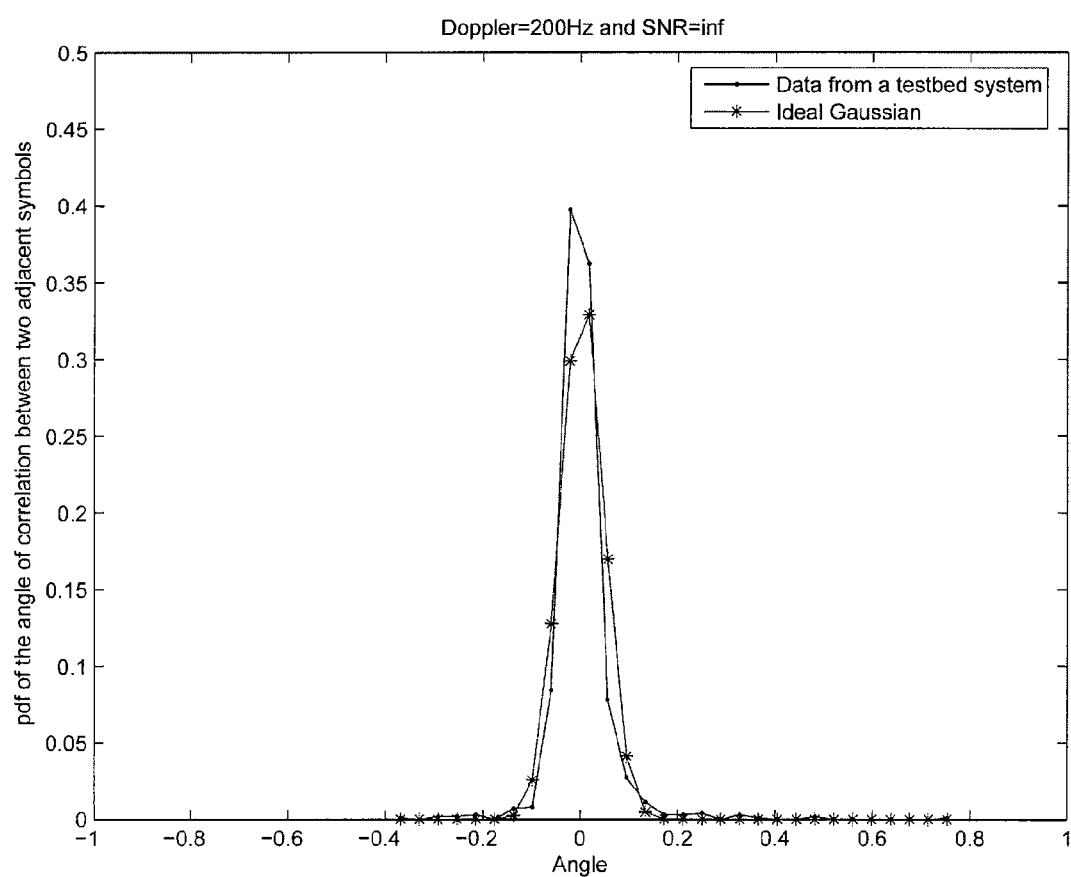
FIG. 2 is a graphical representation of the probability density function of correlation angles in an ISDB-T compliant test system for a clean time-varying channel with 200 Hz Doppler frequency, 6 MHz bandwidth, and a 666 MHz central carrier frequency.

FIG. 2 is a graphical representation of the probability density function of correlation angles in an ISDB-T compliant receiving system for a clean time-varying channel with 200 Hz Doppler frequency, 6 MHz bandwidth, and a 666 MHz central carrier frequency.

Figure 3:
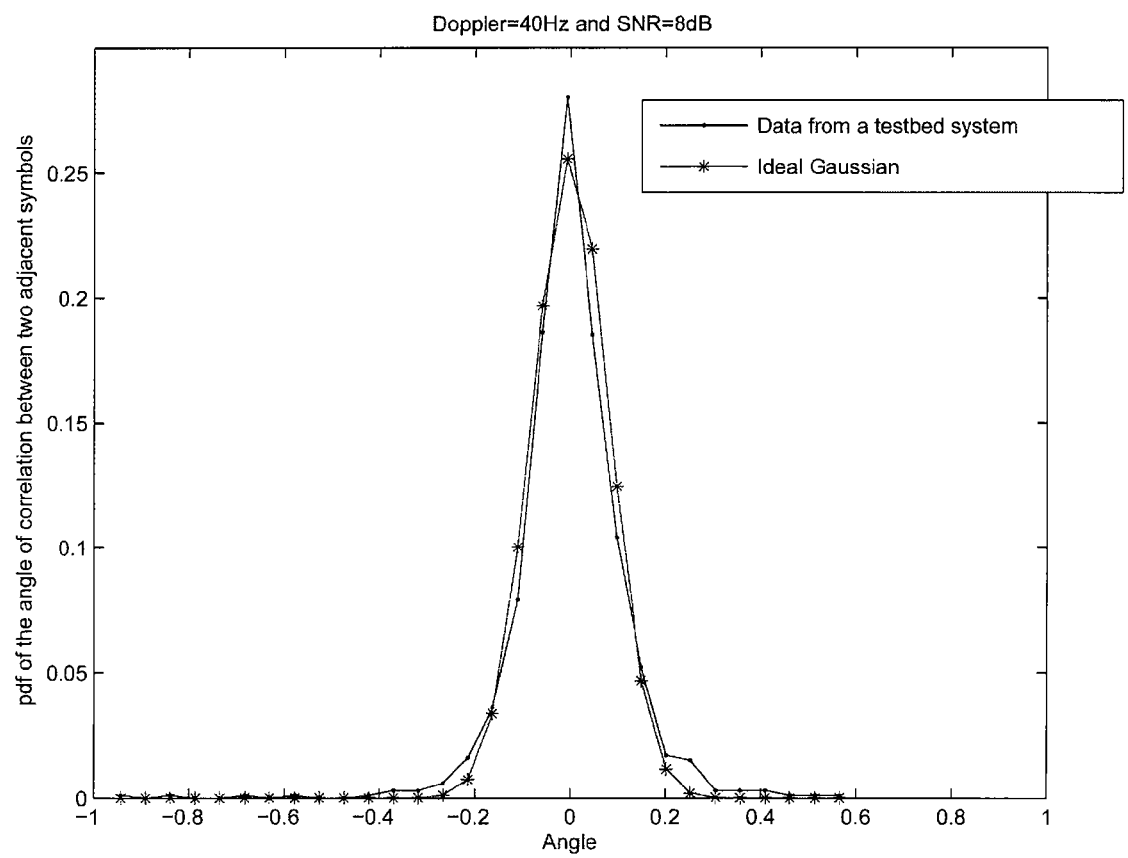
FIG. 3 is a graphical representation of the probability density function of correlation angles in an ISDB-T compliant test system for a time-varying channel with 40 Hz Doppler frequency, 8 dB SNR (Signal to Noise Ratio, a measure of the noise level), 6 MHz bandwidth, and a 666 MHz central carrier frequency.

FIG. 3 is a graphical representation of the probability density function of correlation angles in an ISDB-T compliant receiving system for a time-varying channel with 40 Hz Doppler frequency, 8 dB SNR, 6 MHz bandwidth, and a 666 MHz central carrier frequency. ISDB-T stands for the Integrated Services Digital Broadcasting—Terrestrial standard. It is a Japanese digital television standard that regulates the transmission of a high-definition television channel and a mobile phone channel within a 6 MHz bandwidth that had been reserved originally for television transmissions. ISDB-T adopts multicarrier, specifically, coded OFDM (Orthogonal Frequency Division multiplexing) modulation technology, where each carrier is modulated by QPSK, D-QPSK, 16 QAM or 64 QAM data symbols or pilot symbols. D-QPSK mode 1 of ISDB-T signals is used to generate the curves in FIG. 2 and FIG. 3. In D-QPSK mode 1 of ISDB-T, there are 109 carriers. 96 data carriers are modulated by D-QPSK symbols, 11 control information carriers are modulated by D-BPSK (Differential Binary Phase Shift Keying) symbols, and 2 continuous pilot carriers are modulated by an identical symbol. For the curves in FIG. 2 and FIG. 3, 5000 pilot symbols on a continuous pilot carrier are first obtained from an ISDB-T compliant test receiving system, then the correlation angle of any two successive pilot symbols is evaluated, and finally the probability density function of these correlation angles are plotted. In an ideal case, i.e., a clean static channel and perfect front end receiving process, the correlation angle of any two pilot symbols should be 0, because all continuous pilot symbols are identical. But when time-varying channel conditions and imperfect receiver's front end processing are present, the correlation angle of two successive pilot symbols is no longer a fixed value, but a random variable.

In both FIG. 2 and FIG. 3, the curves marked by "-•-" represent the probability density function of correlation angles for the system data and the curves with "-*-" are for the probability density function of ideal Gaussian variables using the mean and variance obtained from the system data. It is seen that the curves with "-•-" are consistent with the curves with "-*-" The curves in FIG. 2 and FIG. 3 are two examples of many simulation tests to show that the statistics of correlation angles conforms with a Gaussian distribution. Hence, the Gaussian distribution is sufficiently accurate to characterize the distortion effects of time-varying channels and imperfect system front end processing. Since the Gaussian distribution is rather simple, a corresponding demodulation algorithm can be devised in a low-complexity manner.

Figure 4:
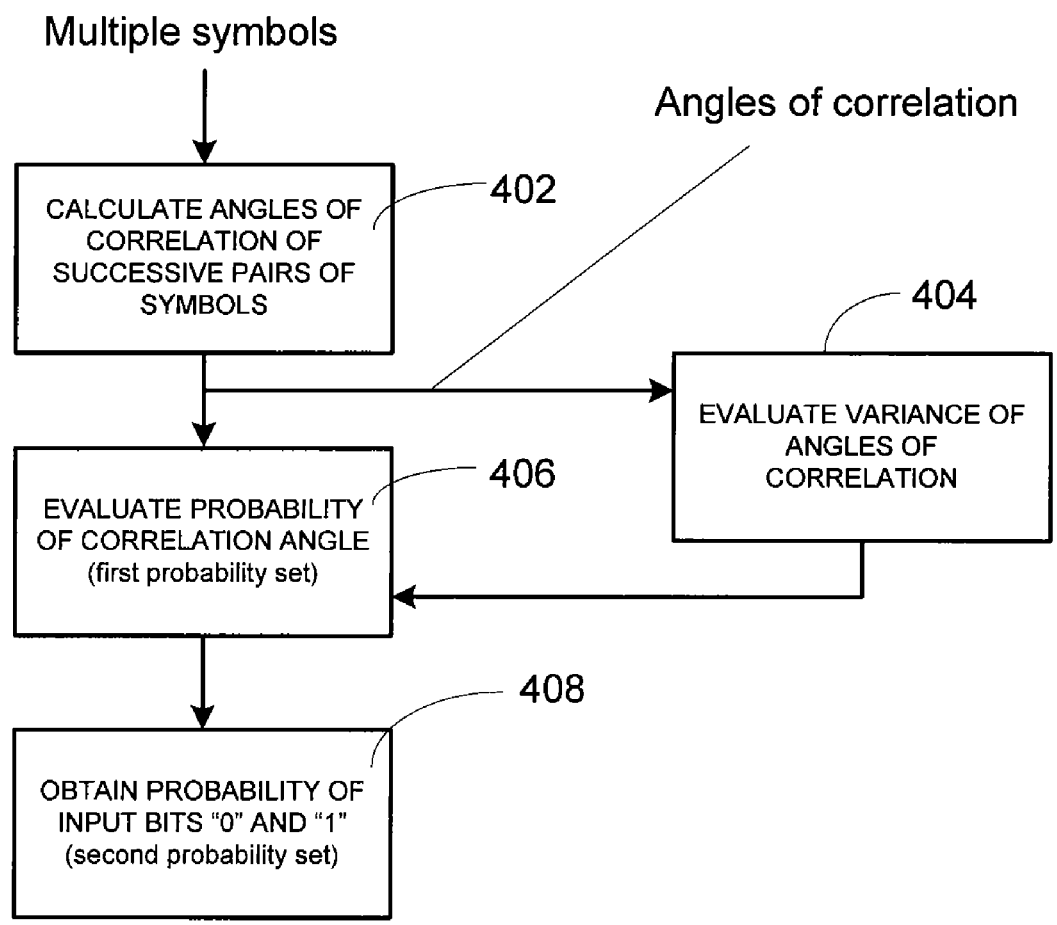
FIG. 4 is a flow chart illustrating a demodulation process according to a method embodiment of the invention.

FIG. 4 is a flow chart illustrating a demodulation process 400 according to a method embodiment of the invention.

For the sake of clarity, ISDB-T signals of D-QPSK mode 1 subjected to a time-varying channel and imperfect front end receiving processing are used in the following description. As stated before, there are 109 carriers in the ISDB-T D-QPSK mode 1, where 96 data carriers are modulated by D-QPSK symbols, 11 control information carriers are modulated by D-BPSK symbols, and 2 continuous pilot carriers are modulated by an identical symbol. Since time-varying channel conditions and imperfect front end receiving processing affect each carrier in the same manner, the resulting statistical characteristics of correlation angles on each carrier should be similar. Based on this fact, the variance of the correlation angles of pilot symbols can be used as the variance of the correlation angles of data symbols on the 96 data carriers.

In practical communication systems, the power of pilot signals is sometimes a little higher than the power of data signals; in the case of ISDB-T, the power of the pilot signals is 25% higher. Then the variance of the correlation angles of pilot symbols can be smaller than that of data symbols. There are two aspects on this issue. On one hand, when the noise level is high, e.g., the SNR (Signal to Noise Ratio) is lower than 6 dB for ISDB-T systems, the difference between the variances of correlation angles for pilot and data signals is negligible. Therefore, it is safe to use the variance for pilot symbols as the variance for data symbols. On the other hand, when the noise level is low, the difference between the correlation angle variances of pilot and data signals is large, and needs to be taken into account. Then the variance of the correlation angle of data symbols should be calculated by using data symbols themselves. A similar method to the calculation of the variance for pilot symbols can be used, except that the possible correlation angle values of a modulation table, e.g., ($\pi/4$, $3\pi/4$, $-3\pi/4$, $-\pi/4$) for DQPSK, need to be taken into account. For simplicity, the variance for pilot symbols are used as the variance for data symbols in the illustration below.

First, as represented by step 402, obtain multiple data symbols and pilot symbols, denoted by $r_1, r_2, \ldots$, and $p_1, p_2, \ldots$, respectively. These symbols are represented by complex numbers having a real and an imaginary part. In step 402, there is calculated the angle of the correlation of pairs of two successive symbols, i.e., $\beta_m = \text{angle}(r_{(m-1)}^* \cdot r_m)$, and $\alpha_m = \text{angle}(p_{(m-1)}^* \cdot p_m)$, for $m = 2, 3, \ldots$, where superscript "*" denotes a complex conjugate. The angle of correlation will be a number in the range of $-\pi$ to $\pi$.

At step 404, there is estimated the variance $\sigma^2$ of those correlation angles of pilot symbols, $\alpha_m$, for m=2, 3, . . . .

At step 406, the correlation angles of data symbols determined at step 402 and the variances determined at step 404 are received. Based on the variances, an evaluation is made of the probability of each phase difference being each of the four possible values ($\pi/4$, $3\pi/4$, $-3\pi/4$, $-\pi/4$). Thus, for each pair of symbols corresponding to a particular correlation angle, four probabilities are determined, i.e. F1=the probability that the correlation angle is $\pi/4$; F2=the probability that the correlation angle is $3\pi/4$; F3=the probability that the correlation angle is $-3\pi/4$; and F4=the probability that the correlation angle is $-\pi/4$.

Consider two successive D-QPSK data symbols, $r_1$ and $r_2$, whose mathematical expressions are given in (1) and (2). According to (1) and (2), $s_1$ and $s_2$ are the corresponding transmitted symbols. Let the phase difference of $r_1$ and $r_2$ be $\beta$, where $\beta$=angle($r_1^* \cdot r_2$). Assuming that $\pi/4$ is the phase difference of $s_1$ and $s_2$, $\beta$ conforms with the Gaussian distribution N($\pi/4,\sigma^2$). Note the variance $\sigma^2$ for pilot symbols is used as the variance for $\beta$. Then the probability of $\beta$ being $\pi/4$, denoted by $F_1$, is evaluated as $$F_1 = \frac{1}{\sqrt{2\pi}\,\delta} \cdot \exp\left(\frac{(\beta - \pi/4)^2}{\delta^2}\right). \quad (3)$$

Similarly, evaluate the probability of $\beta$ being $\pi/4$, $3\pi/4$, $-3\pi/4$, and $-\pi/4$, denoted by F2, F3 and F4, respectively.

Step 408 determines from the probabilities determined in step 406 the probabilities of input bits $b_0$ and $b_1$ being "0" and "1". According to the D-QPSK modulation table, the probability set of {F1, F2, F3, F4} from step 406 can be interpreted as F1=the probability that input bits are (0,0); F2=the probability that the input bits are (0,1); F3=the probability that the input bits are (1,0); and F4=the probability that the input bits are (1,1). Then the process of step 408 is carried out by using the probability set {F1, F2, F3, F4}. Let $P_{b0}(0)$ be the probability of $b_0$ being "0". According to Table 1, $P_{b0}(0)$ is equivalent to the probability of $\beta$ being $\pi/4$ and $-\pi/4$, that is, $$P_{b0}(0)=(F_1+F_4)/4. \quad (4)$$

The factor "¼" comes from the assumption of equal probability of ($\pi/4$, $3\pi/4$, $-3\pi/4$, $-\pi/4$) for $\beta$. The other probabilities are determined in a similar fashion.

$$P_{b0}(1)=(F_2+F_3)/4. \quad (5)$$

$$P_{b1}(0)=(F_1+F_2)/4. \quad (6)$$

$$P_{b1}(1)=(F_3+F_4)/4. \quad (7)$$

Compared with a conventional D-PSK modulation method, the method described herein significantly improves system performance in time-varying channels. As an example stated in the section of BRIEF SUMMARY OF THE INVENTION, a conventional D-QPSK demodulation algorithm used in an ISDB-T compliant system, without symbol interleaving, provides a bit error rate (BER) of 0.002 before Reed-Solomon decoding for a 2-path Rayleigh fading channel with a Doppler frequency of 70 Hz. The inventive approach described herein achieves a BER of less than 0.0001 for a higher fading frequency of 100 Hz under the same conditions.

The presently preferred arrangement for carrying out the process steps described above and particularly with respect to FIG. 4 is by executing software or firmware by a microprocessor. Specific code for directing the calculations can be stored as firmware in an integrated circuit memory or stored as code on a computer readable disk such as, for example, a magnetically readable disk or an optically readable disk.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments reveals the general nature of the invention that others can, by applying knowledge within the skill of the art, readily modify and/or adapt for various applications, without undue experimentation, and without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

The breadth and scope of the present invention should not be limited by any of the above-described exemplary embodiments, but should be defined only in accordance with the following claims and their equivalents.

What is claimed is:

1. A D-PSK demodulator, comprising a processor configured to:
   receive a plurality of D-PSK symbols representing input bits;
   calculate an angle of correlation between any two successive symbols;
   evaluate a variance of correlation angles among those calculated;
   determine a first probability set that includes a probability that the correlation angle is each of a group of possible correlation angles based at, least in part on the calculated angle of correlation and the evaluated variance; and
   determine from the first probability set a second probability set that includes a probability of each input bit being a "0" or a "1".

2. A demodulator according to claim 1, wherein the processor is configured to evaluate a variance of correlation angles based on pilot symbols.

3. A demodulator according to claim 1, wherein the processor is configured to evaluate a variance of correlation angles based, on data symbols.

4. A demodulator according to claim 1, wherein the D-PSK symbols are DQPSK symbols.

5. A demodulator according to claim 1, wherein received D-PSK symbols are received from a multi-carrier communications system.

6. A demodulator according to claim 5, wherein the multi-carrier communications system is an orthogonal frequency division multiplexing (OFDM) system.

7. A demodulator according to claim 1, wherein received D-PSK symbols are received from any of an Integrated Service Digital Broadcasting—Terrestrial (ISDB-T) compliant system; a Digital Audio Broadcasting (DAB) compliant system; a Digital Multimedia Broadcasting (DMB) compliant system, a HomePlug compliant system, and a Brazilian Digital Television System (SBTVD) compliant system.

8. A method of D-PSK demodulation, comprising:
receiving a plurality of D-PSK symbols representing input bits;
calculating an angle of correlation between any two successive symbols;
evaluating a variance of correlation angles among those calculated;
determining a first probability set that includes a probability that the correlation angle is each of a group of possible correlation angles based at least in part on the calculated angle of correlation and the evaluated variance;
determining from the first probability set a second probability set that includes a probability of each input bit being a "0" or a "1".

9. A method according to claim 8, wherein the evaluating a variance of correlation angles comprises evaluating a variance of correlation angles based on pilot symbols.

10. A method according to claim 8 wherein the evaluating a variance of correlation angles comprises evaluating a variance of correlation angles based on data symbols.

11. A method according to claim 8, wherein the D-PSK symbols are D-QPSK symbols.

12. The method of claim 8, wherein received D-PSK symbols are received from a multi-carrier communications system.

13. The method of claim 12, wherein the multi-carrier communications system is an orthogonal frequency division multiplexing (OFDM) system.

14. The method of claim 8, wherein received D-PSK symbols are received from any of an Integrated Service Digital Broadcasting—Terrestrial (ISDB-T) compliant system; a Digital Audio Broadcasting (DAB) compliant system; a Digital Multimedia Broadcasting (DMB) compliant system, a HomePlug compliant system, and a Brazilian Digital Television System (SBTVD) compliant system.

15. A non-transitory computer readable media storing instructions that when executed by a processor cause it to be configured to perform the processes of:
receiving a plurality of D-PSK symbols representing input bits;
calculating an angle of correlation between any two successive symbols;
evaluating a variance of correlation angles among those calculated;
determining a first probability set that includes a probability that the correlation angle is each of a group of possible correlation angles based at least in part on the calculated angle of correlation and the evaluated variance;
determining from the first probability set a second probability set that includes a probability of each input bit being a "0" or a "1".

16. The computer readable media of claim 15, wherein the instructions are in a hardware description language (HDL).

17. A computer readable media storing instructions according to claim 15, wherein the evaluating a variance of correlation angles comprises evaluating a variance of correlation angles based on pilot symbols.

18. A computer readable media storing instructions according to claim 15 wherein the evaluating a variance of correlation angles comprises evaluating a variance of correlation angles based on data symbols.

19. A computer readable media storing instructions according to claim 15, wherein the D-PSK symbols are D-QPSK symbols.

20. A computer readable media storing instructions according to claim 15, wherein received D-PSK symbols are received from a multi-carrier communications system.

21. A computer readable media storing instructions according to claim 20, wherein the multi-carrier communications system is an orthogonal frequency division multiplexing (OFDM) system.

22. A computer readable media storing instructions according to claim 15, wherein received D-PSK symbols are received from any of an Integrated Service Digital Broadcasting—Terrestrial (ISDB-T) compliant system; a Digital Audio Broadcasting (DAB) compliant system; a Digital Multimedia Broadcasting (DMB) compliant system, a HomePlug compliant system, and a Brazilian Digital Television System (SBTVD) compliant system.

23. A method according to claim 8, wherein the method is executed by a processor.

24. A D-PSK demodulator, comprising:
means for receiving a plurality of D-PSK symbols representing input bits;
means for calculating an angle of correlation between any two successive symbols;
means for evaluating a variance of correlation angles among those calculated;
means for determining a first probability set that includes a probability that the correlation angle is each of a group of possible correlation angles based at least in part on the calculated angle of correlation and the evaluated variance; and
means for determining from the first probability set a second probability set that includes a probability of each input bit being a "0" or a "1."

* * * * *